INVENTORS
CHARLES W. ELLIS III
RUTHVEN H. DANIELS
BY Teller & McCormick
ATTORNEYS June 23, 1959 C. W. ELLIS III, ET AL 2,891,741

MECHANISM FOR INDICATING AND CORRECTING LIFT DIFFERENCES IN A HELICOPTER ROTOR

Filed Sept. 27, 1956 5 Sheets-Sheet 2

INVENTORS
CHARLES W. ELLIS III
RUTHVEN H. DANIELS
BY Teller & McCormick
ATTORNEYS June 23, 1959 C. W. ELLIS III, ET AL 2,891,741

MECHANISM FOR INDICATING AND CORRECTING LIFT DIFFERENCES IN A HELICOPTER ROTOR

Filed Sept. 27, 1956 5 Sheets-Sheet 3

INVENTORS
CHARLES W. ELLIS III
RUTHVEN H. DANIELS
BY Teller & McCormick
ATTORNEYS INVENTORS
CHARLES W. ELLIS III
RUTHVEN H. DANIELS
BY Teller & McCormick
ATTORNEYS INVENTORS
CHARLES W. ELLIS III
RUTHVEN H. DANIELS
BY
Teller & McCormick
ATTORNEYS United States Patent Office 2,891,741

Patented June 23, 1959

2,891,741

MECHANISM FOR INDICATING AND CORRECTING LIFT DIFFERENCES IN A HELICOPTER ROTOR

Charles W. Ellis III, Windsor Locks, Conn., and Ruthven H. Daniels, Granville, Mass., assignors to The Kaman Aircraft Corporation, Bloomfield, Conn., a corporation of Connecticut Application September 27, 1956, Serial No. 612,482

15 Claims. (Cl. 244—17.13)

Desirably each blade of a multi-bladed helicopter rotor is exactly like each other blade, and when this is so each blade during each rotor rotation has exactly the same action as each other blade, both as to forces encountered and applied and as to path of movement. However, the blades may unavoidably have minor physical differences in shape or in material or in mounting, and when there are such physical differences the blades may have differences in action or function. The rotor may have an unbalance usually resulting directly or indirectly from a difference in lift between one blade and another and the unbalance gives rise to an undesirable vibration. The unbalance or lift difference ordinarily results in differences in the paths of movement of the blade tips. A common procedure for at least approximately correcting unbalance or lift difference has been to merely make whatever blade adjustments were necessary to bring about uniform paths of blade tip movement, this ordinarily being referred to as "blade tracking."

The Emmerson and Polleys application Serial No. 539,718 for Blade Tracking Mechanism for a Helicopter, filed October 11, 1955, discloses a manually controlled mechanism operable during flight for adjusting the lift of one blade called a "slave" blade relatively to another blade called a "master" blade to correct unbalance or a lift difference and ordinarily to produce "tracking." The invention disclosed in the last said application is particularly adapted for use with a helicopter of the type disclosed in the Kaman and Stevens Patent No. 2,695,674 for Control Systems for Multiple Rotor Helicopter, dated November 30, 1954, but said invention is not necessarily so limited. Said application Serial No. 539,718 and said Patent No. 2,695,674 are incorporated herein by reference.

The use of the mechanism set forth in said Emmerson and Polleys application was entirely subject to the judgment of the pilot and he had no means for specifically indicating the existence of lift difference or for indicating the location or direction thereof. It was necessary for the pilot to sense the vibrations or to visually observe the out-of-track relationship of the blades, or try one adjustment or another until lift equalization was attained.

The Ellis application Serial No. 588,722 for Mechanism for Indicating and Correcting Lift Differences in a Helicopter Rotor, filed June 1, 1956, discloses means for definitely indicating the location and direction of any rotor unbalance, that is, of any difference in lift between the slave blade or blades and the master blade. The indicating means may include an indicator observable by the pilot to enable him to then make the necessary blade adjustment for correcting the unbalance or lift difference or the indicating means may include a switch and a servomotor controlled thereby for automatically making said necessary blade adjustment. The last said application is also incorporated herein by reference.

In the specific mechanisms disclosed in the said Ellis application, the means for indicating unbalance or lift difference is directly dependent upon the relative movement of the slave blade out of its normal relationship with the master blade or with other parts, this relative movement being the result of the lift difference.

The general object of the present invention is to provide a mechanism embodying the broader aspects of the invention disclosed and claimed in said Ellis application, but having its means for indicating or correcting rotor unbalance directly dependent upon and controlled by the vibration of the helicopter fuselage that results from the rotor unbalance to be indicated or corrected.

Other and more specific objects of the invention are to provide various electrical and mechanical features which serve or cooperate for the attainment of the said general objects.

The drawings show in detail two embodiments of the invention, but it will be understood that various changes may be made from the constructions shown and that the drawings are not to be construed as defining or limiting the scope of the invention, the claims forming a part of this specification being relied upon for that purpose.

Figure 22:
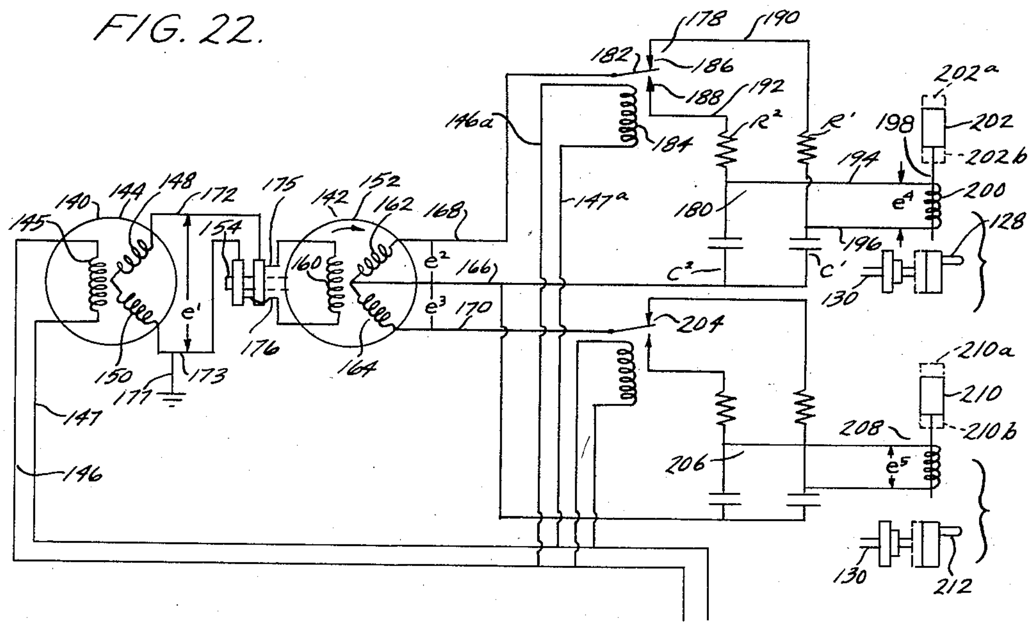
Fig. 22 is a diagram of electrical and mechanical connections which include the parts shown in Figs. 14 to 18 and which also include other parts for indicating lift differences or unbalance.
Figure 23:
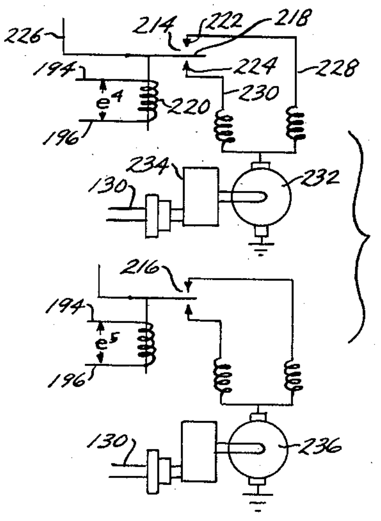

Fig. 23 is a fragmentary diagram similar to a portion of Fig. 22 and showing the electrical and mechanical connections for an automatic means for correcting lift differences or unbalance, some of these connections being alternative to those shown in Fig. 22.

*The helicopter as shown in Figs. 1 to 4*

Figures 1, 2, 3:
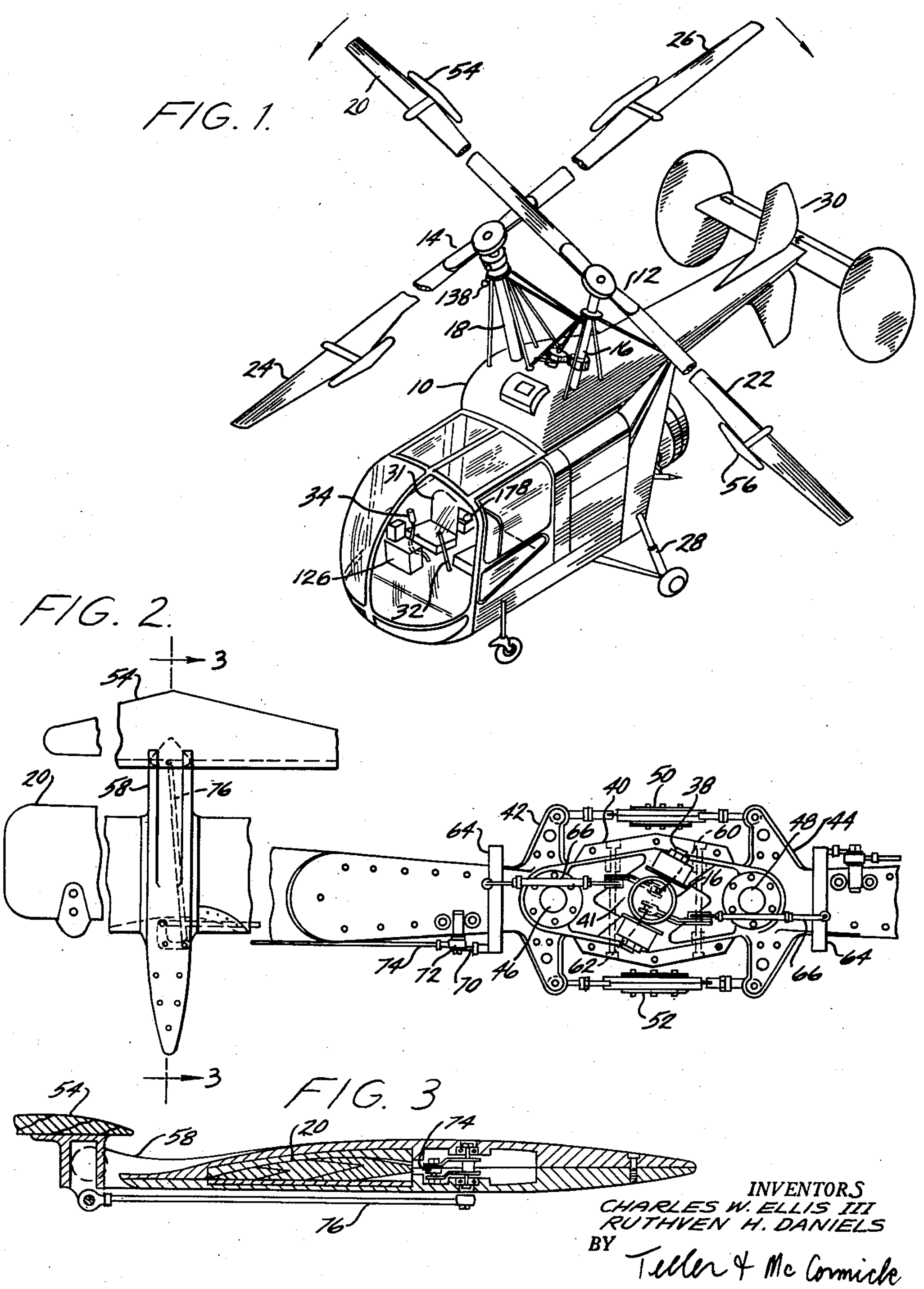
Fig. 1 is a partly schematic perspective view of a helicopter having two rotors and adapted for the incorporation of the present invention therein, this view showing schematically the location of certain electrical parts or devices constituting parts of the mechanism for indicating and correcting lift differences.
Fig. 2 is an enlarged plan view of a portion of one of the rotors shown in Fig. 1.
Fig. 3 is a transverse sectional view taken along the line 3—3 of Fig. 2.
Figures 4, 5, 6, 7:
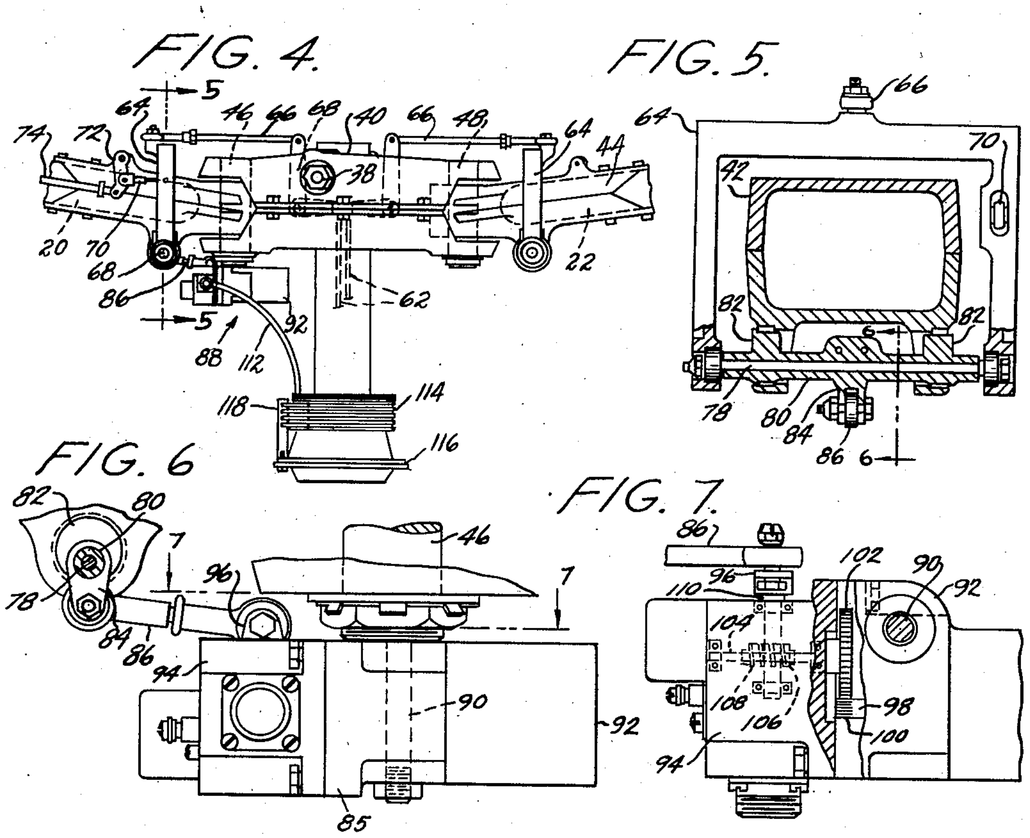
Fig. 4 is a fragmentary side view of the rotor shown in Fig. 3 with certain parts omitted, this view including certain parts of the lift adjusting mechanism.
Fig. 5 is an enlarged vertical sectional view taken along the line 5—5 of Fig. 4.
Fig. 6 is an enlarged fragmentary combined side and sectional view of a portion of the lift equalizing mechanism as shown in Fig. 4, the left sectional portion of this view being taken along the line 6—6 of Fig. 5.
Fig. 7 is a combined plan and horizontal sectional view taken along the line 7—7 of Fig. 6.

The invention as to certain aspects thereof is of general applicability, but as to other aspects it is particularly adapted for a helicopter having rotors of the type disclosed in said Patent No. 2,695,674. Fig. 1 is partly schematic view showing such a helicopter, said view being taken from the left of the helicopter and toward the rear. Figs. 2, 3 and 4 show in greater detail one of the rotors of said helicopter. Reference is made to said patent for a more complete disclosure of any details not herein fully disclosed.

The helicopter, as shown, comprises a fuselage 10 and two rotors 12 and 14 which are connected with supporting and driving shafts 16 and 18, said shafts being adapted to be driven by a motor not shown. Said shafts extend upwardly from said fuselage 10 and as shown they are spaced apart transversely and they diverge upwardly. The said shafts are interconnected for rotation in unison and in opposite directions, the rotors being so connected with the shafts that their blades are in intermeshing relationship. As shown, the rotor 12 has two blades 20 and 22 and the rotor 14 has two blades 24 and 26. When each rotor has two blades said rotors are so connected with the shafts that the blades of either rotor are transverse when those of the other are longitudinal. Stated more broadly and without limitation to two bladed rotors, the rotors are so connected with the shafts that when one blade of either rotor is in a transverse position two blades of the other rotor are equally spaced from said transverse blade. Although the shafts 16 and 18 diverge and are not exactly vertical, said shafts and their axes of rotation will, for convenience, be sometimes referred to as being substantially vertical.

The helicopter as shown includes a landing gear 28, an empennage 30, a pilot seat or position 31 in the fuselage, control sticks 32 and 34 operable by a pilot in said pilot position, and various other parts, some of which are or may be conventional and others of which are disclosed in said patent. These various parts need not be described in detail.

Figure 12:
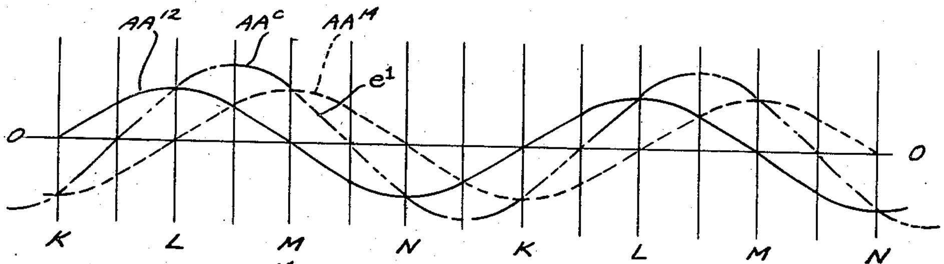
Fig. 12 is a chart illustrating the vibratory movements of the helicopter resulting from blade unbalance and also showing variations in a corresponding electrical value.
Figure 13:
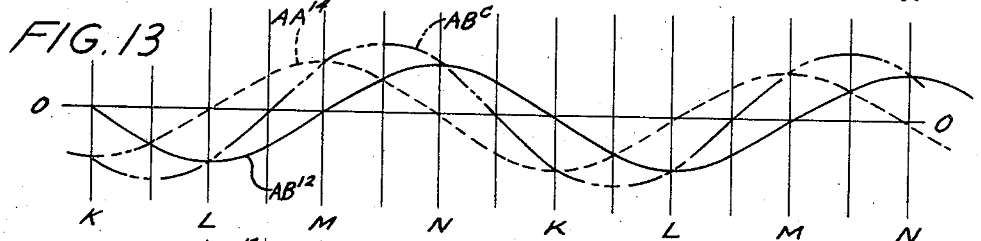
Fig. 13 is a chart similar to Fig. 12, but illustrating vibratory movements resulting from a different condition of blade unbalance.
Figure 14:
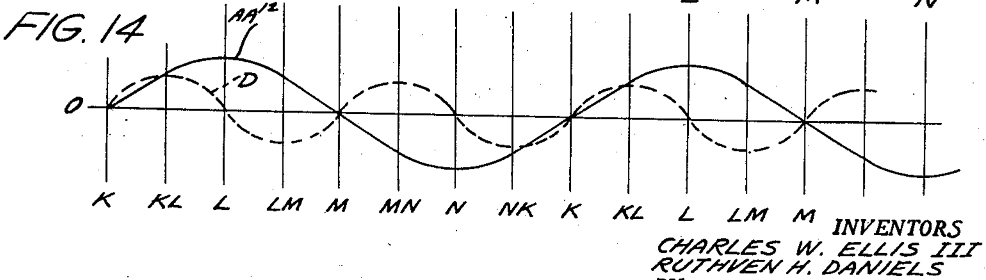
Fig. 14 is a chart similar to Fig. 12 but illustrating the vibratory movements resulting from the unbalance of only one blade.

In order that the manner of operation of the hereinafter described lift equalizing or adjusting mechanism may be fully understood, one rotor and the pitch changing mechanism therefor, and more particularly for one blade thereof, will be fully described. A two-bladed rotor is shown and described, but the invention as to some of its aspects is not so limited. For a three-bladed rotor, the details of blade mounting and connection may be as shown in Figs. 12 to 14 of said application Serial No. 539,718.

Extending through apertures in the upper part of the shaft 16 is a pivot or teetering pin 38 which is shown in Figs. 2 and 4 and serves to pivotally connect a hub member 40 with the shaft, said hub member having a large central aperture 41 through which the upper end of the shaft extends. The pin 38 is perpendicular to the axis of the shaft and said pin is preferably held in fixed relationship to the shaft, the hub member 40 being movable relatively to the pin. The teetering pin 38 is so located with respect to the hub member that the axis of pivotal movement of said hub member is at an acute angle, preferably about 60°, with respect to the longitudinal axes of the blades 20 and 22. The said angle is such that each end of the pivot pin 38 is at the leading side of the longitudinal axis of the corresponding blade.

Two blade supports 42 and 44 are provided at the ends of the hub member 40, these blade supports being connected with the hub member by means of vertical lead-lag hinge pins 46 and 48 for pivotal movement about lag axes parallel to the shaft axis. Said hinge pins are fixed to the respective blade supports and they are movable relatively to the hub member. The inner end or root portions of the blades 20 and 22 are connected with the respective blade supports. Shoulders on the hub member 40 limit relative pivotal movement of the blade supports and the blades in either direction with respect to the hub member. In order to control the movements of the two blade supports and of their corresponding blades about the axes at 46 and 48, said blade supports are interconnected by link means 50 and 52. As hereinafter more fully explained, the two blade supports with their blades do not move in exact unison about said axes, and in order to permit differential movements each of the said link means is variable in length and includes a damper. As shown, the dampers in the said link means act frictionally, but hydraulic dampers may be substituted if desired. The said link means 50 and 52 with the dampers therein resist any pivotal or oscillatory movement of one blade support with its blade about the corresponding lead-lag axis independently of the other blade, but the said means nevertheless permit such independent pivotal or oscillatory movements to limited extents. For more clearly showing other parts, the link 52 is omitted from Fig. 4.

As has been described, the hub and two blades are pivotally movable in unison about the substantially horizontal teetering axis of the pin 38 and the blades are also pivotally movable about the substantially vertical lead-lag axes 46 and 48. In addition, the blades are adjustable about substantially radial axes extending longitudinally of the blades for the purpose of changes of pitch. Preferably the outer end portions of the blades respectively carry auxiliary aerofoil flaps 54 and 56 which are angularly movable relatively to the blades about axes substantially parallel with said longitudinal axes of the blades. Each flap 54 or 56 may be adjusted angularly about the corresponding said longitudinal axis by relatively movable flap moving connections extending from the flaps to the fuselage. When the blades 20 and 22 are rotating, the flaps 54 and 56 serve by reason of aerodynamic forces acting thereon to adjust the corresponding blades and to thus change the effective pitches of the blades. The extent of the changes in the effective pitches of the blades is dependent upon the angular positions of the flaps as determined by their before-mentioned flap moving connections.

The blades 20 and 22 are shown as being rigidly held at their inner ends or root portions so as to prevent any relative rotative movement of said root portions about axes extending longitudinally of the blades. Each blade is initially positioned as shown in Figs. 2 and 3, but said blade is capable of substantial twisting about its longitudinal main axis and with respect to its nonrotatable root portion so that its effective pitch is changed as the result of the twisting. The blade has torsional resiliency which tends to restore it to its initial normal position and shape after twisting. The before-described flaps 54 and 56 serve aerodynamically to twist the blades and to thus change the pitches thereof.

A bracket 58 is provided for pivotally connecting each flap such as 54 with the corresponding blade 20. The mounting means and the flap moving connections for one flap, that is, the flap 54, are shown in detail in Figs. 2, 3 and 4. The flap moving connections are described in detail in said Emmerson and Polleys application and a very brief description will be sufficient for present purposes.

The aforesaid flap moving connections include a link or rod 60 which is located within the hollow shaft 16 and is movable vertically. A similar rod 62 is provided for the flap 56 on the blade 22. The connections between the rods 60 and 62 and the corresponding flaps are similar and when each rod is moved upwardly, the corresponding flap is moved upwardly or counterclockwise, as viewed in Fig. 3, to increase the negative flap pitch and to thus increase the positive pitch of the blade and the upward flexing thereof. When the rods 60 and 62 are moved downwardly, the described movements are reversed and the flaps 54 and 56 are moved downwardly or counterclockwise to decrease the negative flap pitch and to thus decrease the positive pitch of the blade and the upward flexing thereof. Said connection with each flap includes a lever 64 actuated by a link 66, said lever having an inverted U-shape and being pivotally connected to the blade support 42 for movement about a horizontal pivotal axis 68 extending transversely of the blade. Said connection also includes a link 70, and a lever 72 and a push-pull link or rod 74 which extends longitudinally of the blade along the leading edge thereof. Said connection further includes a link 76 extending to the flap.

The rods 60 and 62 for the flaps 54 and 56 on the two blades of the rotor are connected with suitable means in the fuselage for moving them vertically to change the blade pitches in the manner described. By means of said rods the blade pitches may be changed collectively or cyclically, all as fully explained in said Patent No. 2,695,674. The two rods are moved upwardly or downwardly in unison and to uniform extents for collective changes in pitch and they are moved upwardly or downwardly separately and to uniform extents for cyclic changes in pitch.

*Lift adjusting mechanism*

For effecting lift equalization or adjustment any one of the blades of the rotor is arbitrarily chosen as the master blade, and the other or slave blades are adjusted with reference to the master blade so that the lifts of all blades will be substantially equal. For a two-bladed rotor it is only necessary to adjust one slave blade. Usually, but not necessarily, uniformity of lift is attained when the master and slave blades are so adjusted that they "track" at their tips, that is, when the tips of the blades move in the same path. It is recognized that the lift of each blade of a rotor varies substantially during each rotation in accordance with a complex pattern with the result that the tip of the blade does not move in a simple circular path in one plane, but on the contrary moves in a complex path. The complexity of the pattern of the lift and of the path of movement of the blade tips is determined by various factors, such as the alternating forward and rearward movement of each blade during each rotation, centrifugal forces acting on the blades, the tilting or teetering of the rotor about the axis 38 during each rotation, and the cyclical changing of the blade pitches. However, notwithstanding said complexity, the pattern of lift of each blade should always be the same as the pattern for each other blade and with uniformity of the lift patterns the tips of the blades ordinarily move in the same paths.

When the invention is embodied in a helicopter of the type shown in said Patent 2,695,674, the mechanism for changing or adjusting the lift of the slave blade relatively to that of the master blade may advantageously be similar to that disclosed in the Emmerson and Polleys application Serial No. 539,718, filed October 11, 1955. This last said mechanism is shown in Figs. 4, 5, 6 and 7, and it will be now described. Reference is made to said application for any details not herein fully disclosed. When the rotor has more than two blades, the last said mechanism is duplicated for each slave blade.

As illustrated, the blade 22 is the chosen master blade and the blade 20 is the slave blade which must be adjusted so as to compensate for any variation in the lift thereof from that of said master blade. The slave blade 20 is adjusted relatively upwardly or downwardly as required, by adjusting the flap 54 on said blade without any corresponding adjustment of the flap 56 on the blade

22. If the blade 20 is too low, the flap 54 thereon is separately moved clockwise so as to separately increase the pitch of said blade and thus increase the upward flexing thereof. If the blade 20 is too high, the flap 54 thereon is separately moved counterclockwise so as to separately decrease the pitch of said blade and thus decrease the upward flexing thereof.

The separate movement of the flap 54 on the blade 20 is effected by relatively adjusting a portion of the flap moving connection, without impairing the effectiveness of said connection for normally moving the flap. Preferably and as shown, the required adjustment is made by moving a pivot pin 78 which provides the pivotal axis 68 for the lever 64. As best shown in Figs. 5 and 6, the pin 78 is supported by a sleeve 80 which is carried by the corresponding blade support 42. The pin projects beyond the ends of the sleeve and the legs of the U-shaped lever 64 are mounted on the ends of the pin. The sleeve 80 has integral eccentrics 82, 82 which fit bearing apertures in the blade support 42. The sleeve 80 also has an integral arm 84 which extends downwardly and is connected with a link 86. By means of the link 86 the sleeve 80 can be turned and by reason of its eccentric mounting it serves to bodily move the pivot pin 78 and the pivotal axis 68 toward the right or toward the left as viewed in Figs. 4 and 6. When the pin 78 is moved toward the right, the rod 74 is moved toward the right and the negative pitch of the flap 54 is decreased and the upward flexing of the blade 20 is decreased. When the pin 78 is moved toward the left, the rod 74 is moved toward the left and the negative pitch of the flap 54 is increased and the upward flexing of the blade 20 is increased. It will be obvious that the described movement of the pin 78 does not in any way affect the normal control of the flap and of the blade pitch by the described linkage.

For moving the link 86 and for thus effecting lift adjustment as explained, there is provided a mechanism, which is indicated generally by 88 in Fig. 4, but omitted from Fig. 1. This mechanism is carried by and rotatable with the rotor and which is adapted to be operated or controlled by means to be hereinafter described. As to details, said mechanism 88 can be widely varied, but one mechanism having certain advantageous features is shown in Figs. 4, 6 and 7, reference being made to said application Serial No. 539,718 for a more complete disclosure.

The mechanism 88 is movable with the blade 20 about the axis of the corresponding lead-lag hinge pin 46. Preferably and as shown, said mechanism 88 is carried directly by said lead-lag hinge pin by means of a vertical pin 90 which is in effect an extension of said lead-lag hinge pin. The mechanism 88 is shown as comprising a rotary electrical actuator unit 92, a gearing unit 94, and a pivoted arm 96 carried by the unit 94 and connected with the link 86. The two units 92 and 94 are rigidly connected with each other. Inasmuch as the mechanism is mounted eccentrically of the axis of rotor rotation, a suitable counterweight, not shown, may be provided.

The actuator unit 92 comprises a rotor 98 which includes a longitudinal shaft, only said shaft being shown in the drawings. Said shaft of the rotor has a pinion 100 at its outer end, as shown in Fig. 7. The pinion 100 meshes with a gear 102 on a longitudinal shaft 104 mounted in the gearing unit and extending into the actuator unit. The shaft 104 carries a worm 106 which meshes with a worm wheel 108 on a transverse shaft 110. The shaft 110 projects at the rear as viewed in Fig. 7, and said arm 96 is secured to the projecting end of said shaft.

Current for operating the rotary actuator unit 92 and for other purposes is supplied to the rotor through wires in a cable 112 which wires are connected respectively with selected rotary slip rings in a group 114 of such rings on the rotor shaft 16. A nonrotary structure 116 is provided adjacent said shaft and brushes 118 on said structure engage and provide electrical connection with said slip rings.

*Control means for lift adjusting mechanism*

Figure 8:
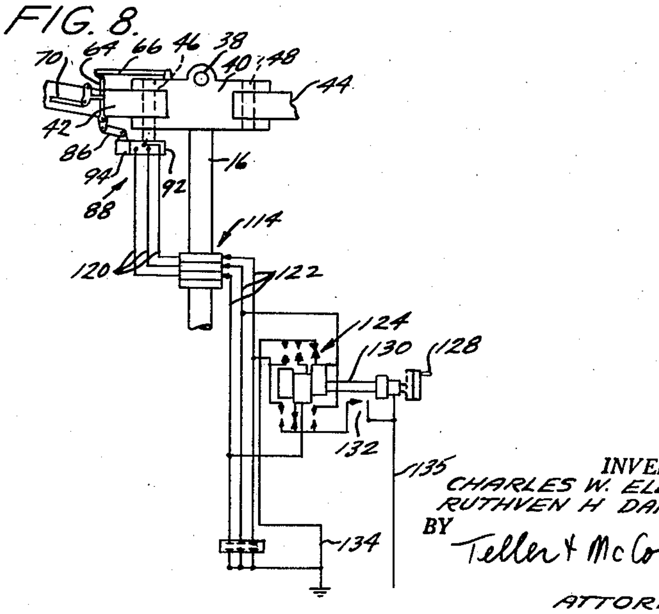
Fig. 8 is a diagram of electrical and mechanical connections for the blade adjusting mechanism.

The rotor 98 of the actuator unit 92 has a shiftable or rotatable field, and as shown in Fig. 8 this field is controlled by the current in three conductors 120 which revolve with the hub and are included in the cable 112, the wires serving to rotate the field of the actuator and to cause the rotor thereof to correspondingly rotate. The movable conductors 120 are connected through the slip rings and the brushes with nonrotary conductors 122. The conductors 122 are connected with means on the fuselage 10, such as a step switch 124 for supplying current to the actuator in such a manner as to rotate the field thereof. The step switch and immediately associated parts may be enclosed or partly enclosed in a box 126 located within convenient reach of the pilot as shown in Fig. 1. The step switch 124 is shown in Fig. 8 as including a rotatable element and as being of a known type. In accordance with recognized practice the construction and connections of the switch 124 and of the actuator are such that the current transmitted to the actuator through the described conductors serves to turn the rotor 98 of the actuator unit 92 in unison with the turning of the rotatable element of the switch 124. An example of a motor and a step switch similar to those herein disclosed is found in Patent No. 2,327,341, dated August 24, 1943.

The step switch 124 is shown in Fig. 8 as being manually operable by a rotatable crank or handle 128 on a shaft 130. The switch 124 is connectible by a normally open switch 132 with main leads 134 and 135 connected with a source of low voltage direct current. When manually controlled lift adjustment is to be effected, the pilot moves the handle 128 longitudinally of the shaft to close the switch 132 and thus connect the switch 124 in the circuit. Then the pilot turns the handle 128 in one direction or the other and the step switch 124 causes the rotor 98 of the actuator to turn at the same speed as the handle.

The handle 128 and the parts operated thereby including the switch 124 constitute control means for the lift adjustment mechanism 88, said control means being carried by the fuselage 10 independently of the rotor 12. The conductors 122 and the slip rings 114 and the conductors 120 included in the cable 112 constitute means operatively connecting said control means on the fuselage with the said lift adjustment mechanism 88 on the rotor for enabling said control means to control the operation of said lift adjustment mechanism during rotation of said rotor.

When the helicopter has two rotors such as 12 and 14, it is necessary to provide two lift adjusting means, one for each rotor. The parts and connections shown in Fig. 8 may be regarded as being for the rotor 12. Duplicate parts and connections are provided for the rotor 14.

The helicopter and the lift adjusting mechanisms and control means for such mechanisms as thus far described are essentially the same as set forth in said Emmerson and Polleys application Serial No. 539,718. The present invention is not necessarily so limited, but said helicopter and said adjusting mechanism and said control means are fully disclosed for the reason that they are adequately adapted for cooperation with other features to which the invention more specifically relates.

*Means responsive to vibration—Figs. 9 to 21*

The present invention relates particularly to automatically acting means adapted for indicating any unbalance in a helicopter rotor and dependent upon and controlled by a device responsive to the vibration of the fuselage resulting from the said unbalance. The preferred mechanism as to be described in connection with Figs. 9 to 19 is suitable for a helicopter having two rotors, but the invention in its broader aspects is not so limited, as will be hereinafter explained in detail.

Figure 9:
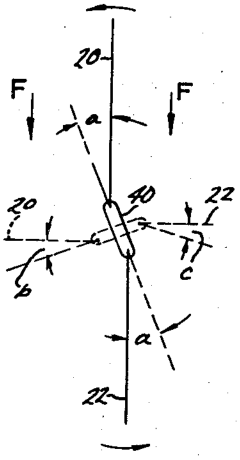
Fig. 9 is a schematic view illustrating the relative oscillatory movements of the blades of one rotor.
Figure 10:
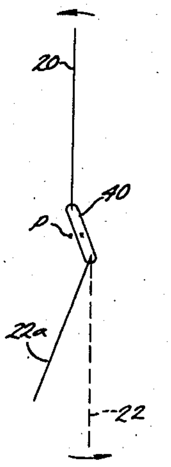
Fig. 10 is a schematic view similar to Fig. 9 but showing one blade relatively displaced as the result of unbalance.

There may be various causes for unbalance in a helicopter rotor, but when the blades are connected with the hub for movement about lag axes such as those at 46 and 48 a major portion of any unbalance may result at least indirectly from a difference in the lift of the blades. Assuming uniformity of blade lift, the normal action of the blades with respect to the lag axes is illustrated in Fig. 9 which is entirely schematic and is not intended to represent actual angular values. The full lines 20 and 22 represent the positions of the blades of the rotor 12 with respect to the hub member 40 when the blades extend in the direction of flight as indicated by the arrows F, F. The blades are at their average lag angles *a*, *a* with respect to the hub member 40. When the hub has moved 90° the forwardly moving blade 20 may lead its average position by the angle *b* and the rearwardly moving blade 22 may lag behind its average position by the angle *c*. Each blade follows the same pattern and during each rotation each blade is successively in the four positions shown in Fig. 9. However, the relative movements of said blades are opposite in phase. The disclosed blade relationships and movements are merely representative and they may vary considerably with varying conditions of flight.

When the blades have equal lifts, their combined center of gravity is at or close to the axis of rotor rotation, particularly when the blades are longitudinal. However, if the slave blade 20 has a lift greater than that of the master blade 22, said slave blade offers greater aerodynamic resistance to rotation and in each rotative position of the hub said slave blade lags behind the corresponding position of the master blade, as shown for instance at $22^a$ in Fig. 10. The described action is reversed when the slave blade has a lesser lift. With the slave blade in the position $22^a$ as shown, the combined center of gravity of the two blades is not at the axis of rotor rotation but is at a position such as P which is eccentric of said axis of rotation.

Figure 11:
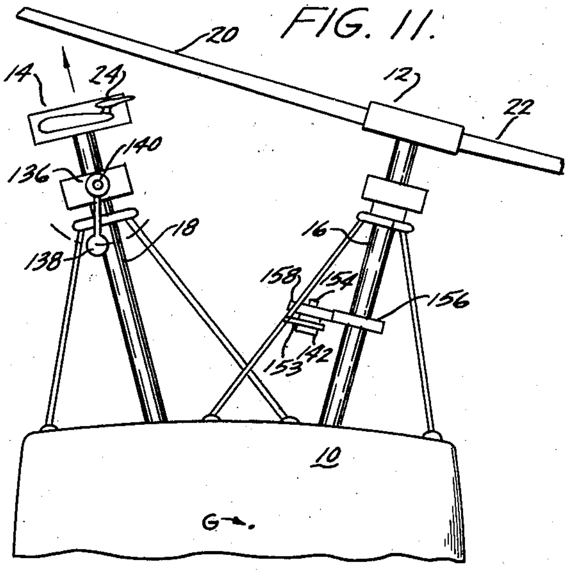
Fig. 11 is a fragmentary schematic view looking rearwardly and showing the two rotors and certain other parts of a helicopter.

Fig. 11 schematically shows the two rotors 12 and 14 on the fuselage 10. With the center of gravity of the blades of one rotor such as 12 at the eccentric position P shown in Fig. 10, said blades during rotation impart oscillations or vibrations to the fuselage 10, these vibrations being in harmony with the rate of rotor rotation, that is, the vibrations have a frequency of one per revolution. The fuselage and the parts thereon vibrate about their combined center of gravity G as shown in said Fig. 11 and the amplitude of vibration is ordinarily greater in rolling, that is, in vibration about a longitudinal axis extending through said center of gravity. The described eccentricity of the center of gravity of the rotor is the major factor in any vibrations resulting from difference in blade lift. However, there are other relatively minor factors, one of which involves the revolving position of the center of greater lift. The vibrations resulting from all of said factors are of small amplitude but they are nevertheless very troublesome.

When there are two rotors 12 and 14 there may be unbalance in each rotor, and each rotor may therefore act to cause vibrations of the fuselage. However, the two rotors are out of phase by 90° and the vibrations caused by two such unbalanced rotors are similarly out of phase. The full line $AA^{12}$ in the chart in Fig. 12 indicates the vibrations caused by one unbalanced rotor such as 12, each vibration cycle running between the lines K, K. The broken line $AA^{14}$ in said chart indicates the vibrations caused by the other unbalanced rotor such as 14, each vibration cycle running between the lines L, L.

The time interval from the line K at the left to the next line K represents one complete rotation of the rotor 12 from one transverse position to the next transverse position. The curve $AA^{12}$ passes through zero at said lines K, K and at intermediate lines M, M, and it has maximum plus and minus values at intermediate lines L, L and N, N. The rotors 12 and 14 are out of phase by 90° and therefore the time interval from the line L at the left to the next line L represents the rotation of the rotor 14 from one transverse position to the next transverse position, each line L being 90° from the preceding line K. The curve $AA^{14}$ passes through zero at said lines L, L and at intermediate lines N, N, and it has maximum plus and minus values at intermediate lines M, M and K, K. When the component vibrations $AA^{12}$ and $AA^{14}$ are related as shown, they result in a combined pattern of vibrations as shown by the dotted line $AA^c$.

In the chart in Fig. 12 it may be assumed that the vibrations caused by each result from a lift of the slave blades greater than that of the master blade. The position of either curve would be reversed, without any change in phase relationship, if the slave blade had a lesser lift instead of a greater lift. Fig. 13 shows the pattern of vibrations with the curve $AA^{12}$ reversed to become $AB^{12}$ when the slave blade has a lesser lift. With the position of either or both curves reversed, the combined pattern represented by the curve $AA^c$ would be correspondingly changed from that shown in Fig. 12, and Fig. 13 shows a combined pattern represented by a curve $AB^c$.

In the charts in Figs. 12 and 13 it has been assumed that there is unbalance in both rotors. However, there may be unbalance in only one rotor, as for instance in the rotor 12. Fig. 14 shows the corresponding pattern of vibrations, the curve $AA^{12}$ being exactly the same as that shown in Figs. 12 and 13 but without any modification thereof by a curve such as $AA^{14}$.

Referring again to Fig. 11, the helicopter carries an accelerometer or other vibration responsive device 136 which is mounted on the fuselage as far as reasonably possible from the center of gravity G so as to have the benefit of maximum vibratory movements. Preferably the device 136 is mounted on the pylon for one of the rotor shafts. As shown, the accelerometer includes a pendulum 138 and this is preferably movable about a longitudinal axis so as to be responsive to rolling vibrations. As rolling vibrations take place the pendulum 138 correspondingly oscillates on its pivotal axis, the pendulum oscillations corresponding to the fuselage vibrations as shown by the curve $AA^c$ in Fig. 12. The timing of said pendulum oscillations with respect to the rotations of the rotors is utilized for indicating or correcting the unbalance of the rotors which causes said vibrations. Electrical devices are preferably provided for this purpose.

As shown, there is provded an electrical system which includes two electrical devices one of which is connected with the pendulum of the accelerometer and the other of which is mounted for rotation in synchronism with the rotors. Each of the said electrical devices is preferably a "synchro," which is a device having some of the characteristics of a transformer, but having its primary and secondary coils or windings so mounted that they are relatively movable angularly with the result that for any selected primary current the character of the resultant secondary current or signal varies with variations in the angular relationship. Such devices or synchros are respectively designated 140 and 142, and they are sometimes hereinafter referred to as the "first" and "second" synchros.

Figure 15:
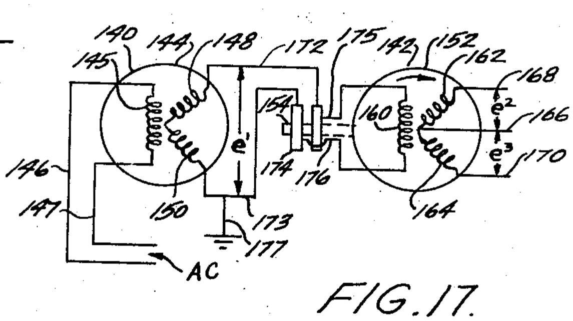
Fig. 15 is a diagram of electrical and mechanical connections for detecting blade unbalance and the characteristics thereof.

The first synchro 140 is associated with the pendulum 138 on the pylon for one rotor shaft. As schematically shown in Fig. 15, said synchro includes an outer housing 144 which is concentric with the axis of the pendulum 138 and includes an inner core positioned within the housing. Said housing and said core are relatively oscillable and one of them is rigidly connected with said pendulum for oscillatory movement therewith. Preferably and as shown it is the core that is connected with the pendulum and the housing is rigidly connected with the pylon. The oscillatory core includes a transverse winding or coil 145. The axis of the coil 145 preferably intersects the axis of oscillation, but for convenience of illustration it is shown as being eccentric. Said coil is connected by conductors 146 and 147 with a suitable source of alternating current, which may be 26 volt, 400 c.p.s. The synchro 140 also includes two similar windings or coils 148 and 150 within the stationary housing 144 and carried thereby, said coils being connected with each other at their inner ends. Said stationary coils 148 and 150 are generally radial and they are oppositely wound. They have an angular spacing which is shown as being 90°, but this angular spacing is not critical. The oscillatory coil 145 when connected as described is the primary coil, and the series connected stationary coils 148 and 150 are the secondary coils.

The second synchro 142 is generally similar to the synchro 140. It includes an outer housing 152 and it also includes inner core positioned within the housing. One of the last said parts of the synchro 142 is rotatable and the other is stationary. Preferably the housing 152 is held stationary by any suitable means such as a bracket 153, and the core is connected with a rotatable shaft 154. Said shaft is rotated in timed relation with the rotor or rotors, and as shown in Fig. 11, said shaft is rotated by gears 156 and 158 at the same speed as one rotor shaft such as the shaft 16. The rotor or core includes a transverse winding or coil 160, the axis of which preferably intersects the axis of rotation, although for convenience of illustration it is shown as being eccentric. The direction of rotation will be assumed to be clockwise as viewed in Fig. 15. The synchro 142 also includes two similar windings or coils 162 and 164 within the stationary housing 152 and carried thereby, said coils being connected with each other at their inner ends and being there grounded by a conductor 166. The outer ends of said coils are connected with conductors 168 and 170. Said coils 162 and 164 are generally radial and they have an angular spacing of 90°. This angular spacing conforms to the phase spacing of the two helicopter rotors 12 and 14.

Conductors 172 and 173 are connected with the outer ends of the stationary coils 148 and 150 of the synchro 140 and said conductors are connected through slip rings 174 with rotary conductors 175 and 176 which are in turn connected with the ends of the rotary coil 160 of the synchro 142. One of said conductors 172 and 173 is grounded as shown at 177. As shown, the conductor 173 connected with the coil 150 is so grounded. It will be seen that the coils 148, 150 and 160 are connected in a closed series which is grounded at 177.

Alternating current is supplied as aforesaid to the oscillating coil 145 of the first synchro 140, and as a result of said current a voltage $e^1$ is induced between the conductors 172 and 173. As stated, the coils 148 and 150 are oppositely wound, and it will be assumed that the coil 148 tends to induce a positive voltage $e^1$ and that the coil 150 tends to induce a negative voltage $e^1$. Said voltage $e^1$ is applied to the coil 160 which is the primary coil of the second synchro 142. When there is a definite voltage in said primary coil 160, voltages are induced in one or the other or both of the secondary coils 162 and 164 and between the conductors 168, 166 and 170. Such voltages are indicated respectively at $e^2$ and $e^3$. It will be obvious that, when the voltage $e^1$ is zero, the voltages $e^2$ and $e^3$ are also zero.

With no vibration and with the pendulum 138 vertical and stationary, the voltage $e^1$ is zero, this being due to the fact that the secondary coils 148 and 150 act oppositely and cancel each other. When there is vibration resulting from unbalance in either or both rotors, the pendulum 138 oscillates in accordance with the vibrations. This cyclically changes the angular relationship between the primary coil 145 of the synchro 140 and the secondary coils 148 and 150 thereof with the result that the voltage inducing tendency of each coil momentarily prevails over that of the other, the action of the two secondary coils serving alternately to change the voltage $e^1$, between plus and minus exactly in accordance with the pattern of the vibrations as shown for instance in Fig. 12.

The summation of the voltage changes corresponds to the curve $AA^c$ and this is the combination of the voltage changes resulting from the unbalance of the two rotors. The line $AA^c$ can therefore be regarded as also representing the combined varying voltage $e^1$. As shown in said Fig. 12, the voltages $e^1$ at the half-revolution positions L, N and L result entirely from the unbalance of the rotor 12. Similary the voltages $e^1$ at the half-revolution positions M, K and M result entirely from the unbalance of the rotor 14.

Figure 16:
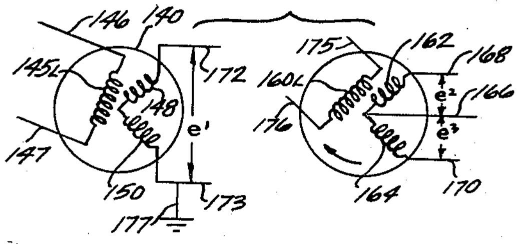
Figs. 16 to 19 are views similar to Fig. 15, but showing the several parts in different relative positions.

*Position L, Fig. 16.*—The stationary secondary coils 162 and 164 ofthe second synchro 142 can be regarded as allocated respectively to the rotors 12 and 14. As already stated, the primary coil 160 is rotated in synchronism with the rotation of the two rotors. The timing is such that, with the rotor 12 in a transverse position as shown in Fig. 1, the coil 160 is parallel to the coil 162 and perpendicular to the coil 164, said coil being at the position $160^L$ as shown in Fig. 16. At this instant the coil 145 is at the position $145^L$ which corresponds to position L in Fig. 12. Said coil 145 is near its limit of movement in one direction and has approached the secondary coil 148 and has receded from the secondary coil 150. The extent of movement of said coil 145 has been exaggerated for clarity of illustration. The positive tendency of the coil 148 prevails over the negative tendency of the coil 150 and the voltage $e^1$ is positive. In the last said position, the positive voltage $e^1$ results entirely from unbalance in the rotor 12 and there is no voltage resulting from the unbalance if any in the rotor 14. The positive voltage $e^1$ induced by the first synchro at the position L is transmitted to the coil 160 at said position $160^L$, and there is a voltage drop in said coil from the conductor 175 to the conductor 176. As the result of said positive voltage $e^1$ and said voltage drop, a voltage $e^2$ is induced in the coil 162 and between the conductors 168 and 166. The coil 162 is so wound that this voltage is positive. There is little or no induced voltage in the coil 164 and the voltage $e^3$ between the conductors 166 and 170 is zero or substantially so.

Figure 17:
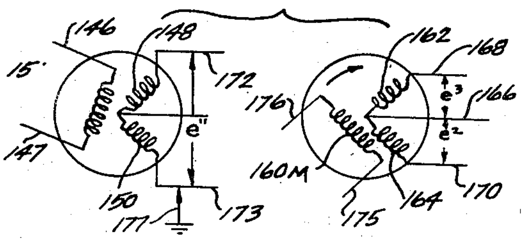

*Position M, Fig. 17.*—After a quarter-revolution to the position M shown in Fig. 12 the rotor 14 is in a transverse position. With the particular type of unbalance indicated by said Fig. 12, the coil 145 of the first synchro is in the position $145^M$ which is the same as the position $145^L$, it being remembered that the coil 145 oscillates in conformity with the curve $AA^c$. The voltage $e^1$ is still positive, but it results entirely from the unbalance in the rotor 14 and there is no voltage resulting from the unbalance if any in the rotor 12. As shown in Fig. 12, the coil 160 of the second synchro is now parallel with the coil 164 instead of with the coil 162 and is at the position $160^M$. The positive voltage $e^1$ induced by the first synchro at the position M is transmitted to the coil 160 at the position $160^M$ and there is a voltage drop in said coil from the conductor 175 to the conductor 176. As the result of said positive voltage and said voltage drop, a voltage $e^3$ is induced in the coil 164 and between the conductors 166 and 170. The coil 164 is so wound that said voltage $e^3$ is positive. There is little or no induced voltage in the coil 162 and the voltage $e^2$ between the conductors 168 and 166 is zero or substantially so.

Figure 18:
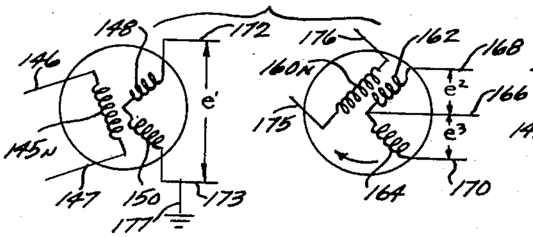

*Position N, Fig. 18.*—After a second quarter-revolution to the position N shown in Fig. 12, the rotor 12 is again in a transverse position but with the blades reversed from their positions as shown in Fig. 1. At this instant the coil 145 of the first synchro is at the position $145^N$ shown in Fig. 18. Said coil 145 is near its limit of movement in the opposite direction and has approached the secondary coil 150 and has receded from the secondary coil 148. In the last said position, the negative voltage $e^1$ results entirely from unbalance in the rotor 12 and there is no voltage resulting from the unbalance if any in the rotor 14. The coil 160 of the second synchro 142 is in the position $160^N$ shown in Fig. 17, this position being similar to the position $160^L$, but with the coil reversed. The positions of the conductors 175 and 176 have been reversed as indicated, and the direction of the voltage drop has therefore been reversed. The voltage $e^1$ is now negative instead of positive but because of the reversed direction of the voltage drop the voltage $e^2$ is again positive.

Figure 19:
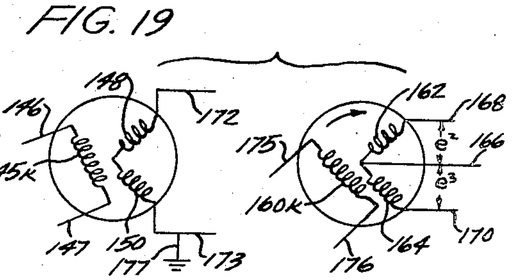

*Position K, Fig. 19.*—After a third quarter-revolution to the position K shown in Fig. 12, the rotor 14 is again in a transverse position but with the blades reversed from the preceding transverse position. The coil 145 is in the position $145^K$ which is the same as the position $145^N$ and it again induces a negative voltage $e^1$. The coil 160 of the second synchro 142 is in the position $160^K$ as shown in Fig. 19, this position being the same as the position $160^M$ but with the coil reversed. The positions of the conductors 175 and 176 have been reversed as indicated, and the direction of the voltage drop has therefore been reversed. The voltage $e^1$ is now negative but because of the reversed direction of the voltage drop the voltage $e^3$ is again positive.

It will be observed that in each of the positions shown in Figs. 16 to 19, the primary and second coils of the second synchro are in the relative positions for generating maximum voltage in said secondary coils and that the voltage of cyclically varying current transmitted from the first synchro is also at its maximum.

As before stated, Fig. 13 shows the pattern of the vibrations when the unbalance in the rotor 12 is due to a lesser lift in the slave blade instead of a greater lift. The unbalance in the rotor 14 is unchanged. The previously described conditions at positions M and K are unchanged but at positions L and N the previously described conditions are reversed. At position L, for instance, the coil 145 is at a position which is the same as position $145^N$ or $145^K$, but the position of coil 160 is unchanged at $160^L$. The voltage $e^1$ is negative, and this reverses the direction of the voltage drop in the coil 160 so that the voltage $e^2$ is negative instead of positive. Said voltage $e^2$ is also negative at position N. If the slave blade of the rotor 14 had a lesser lift instead of a greater lift, the curve $AA^{14}$ would be reversed and the voltage $e^3$ at M and K would be negative instead of positive. From the foregoing it will be apparent that a greater lift in either slave blade results in a positive value for the corresponding voltage $e^2$ or $e^3$, and that a lesser lift in either slave blade results in a negative value for the corresponding voltage $e^2$ or $e^3$.

Figure 20:
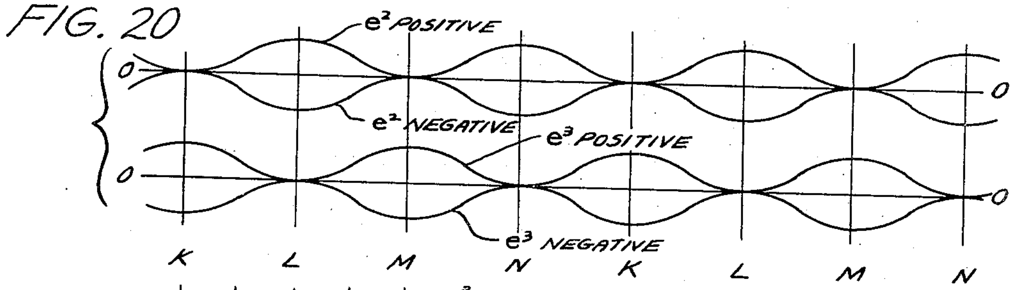
Fig. 20 is a chart illustrating the character of the electrical signals that indicate unbalance.

From the foregoing description as to the several positions, and assuming unbalance in both rotors, it will be evident that the voltage $e^2$ and the voltage $e^3$ will vary approximately as indicated in Fig. 20, wherein the letters K, L, M and N have the same significance as in Fig. 12. The voltages are positive when the unbalance results from slave blades having greater lifts than the master blades, and the voltages are negative when the unbalance results from slave blades having lesser lifts than the master blades. As hereinafter explained, the currents resulting from the positive and negative voltages $e^2$ and $e^3$ are utilized for operating signals as the lift differences and the directions thereof. Within reasonable limits, the actual values of the voltages $e^2$ and $e^3$ are unimportant, it being the polarities of said voltages that are relied upon.

Figure 21:
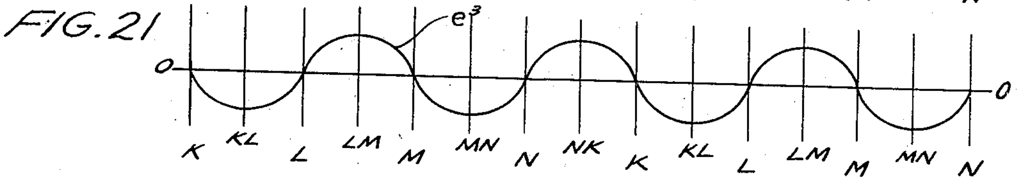
Fig. 21 is a chart similar to Fig. 20, but showing the character of the electrical signal for a balanced rotor.

If there is unbalance in only one rotor, as for instance in the rotor 12, the pattern of vibration is as shown in Fig. 14. With each vibration a varying voltage signal $e^2$ is induced in the synchro coil 162 as fully explained. At the same time an incidental voltage $e^3$ will be induced by the synchro coil 164. The character of the incidental voltage will be as explained with reference to Fig. 14. The $e^3$ voltages are shown in Fig. 21.

At the position L shown in Fig. 16 the voltage $e^1$ is positive but the voltage $e^3$ is zero because the coils 160 and 164 are perpendicular to each other; at the intermediate position LM the voltage $e^1$ is positive and the voltage $e^3$ is positive because the coil 160 is approaching position M as shown in Fig. 17; at said position M the voltage $e^1$ is zero and the voltage $e^3$ is resultantly zero; at the intermediate position MN the voltage $e^1$ is negative and the voltage $e^3$ is negative because the coil 160 is approaching position N as shown in Fig. 18; at said position N the voltage $e^1$ is negative but the voltage $e^3$ is zero because the coils 160 and 164 are perpendicular to each other; at the intermediate position NK the voltage $e^1$ is negative and the voltage $e^3$ is positive because the coil 160 is approaching the position K shown in Fig. 19; at said position K the voltage $e^1$ is zero and the voltage $e^3$ is resultantly zero; and at the intermediate position KL the voltage $e^1$ is positive and the voltage $e^3$ is negative because the coil 160 is approaching position L shown in Fig. 16. In four of the described eight positions the voltage $e^3$ is zero; in two of said positions the voltage $e^3$ is positive; and in two of said positions the voltage $e^3$ is negative. The average voltage $e^3$ is zero.

In the foregoing description, it has been assumed that the helicopter is normally level, and that in the absence of vibration the pendulum 138 is vertical with the coil 145 in neutral position as shown in Fig. 15. However, if the helicopter is transversely tilted the coil 145 throughout a period of many cycles may occupy a position such as the position 145$^L$ in Fig. 16. In this position of the coil 145 the voltage $e^1$ is positive. When the coil 160 is in the position 160$^L$ the voltage $e^2$ is positive as before explained. However, when the coil 160 reaches the position 160$^N$ shown in Fig. 18, the voltage $e^1$ is still positive, and the voltage $e^2$ is negative. Thus the voltage $e^2$ is alternately positive and negative and the average is zero.

In addition to the fuselage vibrations due to rotor unbalance which have been fully explained, there may be other fuselage vibrations at the rate of two-per-revolution in a helicopter having two-bladed rotors. Vibrations such as those last mentioned are fully explained in the application of Charles H. Kaman and Martin L. Stevens, Serial No. 568,823, filed March 1, 1956, and entitled Harmonic Anti-Vibration Means for a Helicopter, said application disclosing mechanism for eliminating said vibrations. But even if the last said mechanism is not used, the said two-per-revolution vibrations would not affect the signals $e^2$ and $e^3$.

Referring again to Fig. 14, the dotted curve D shows the pattern of two-per-revolution vibrations, such as above discussed, this curve being shown in comparison with the curve AA$^{12}$ which shows the pattern of vibrations due to unbalance in a single rotor. It will be observed that the curve D has positive value at the lines KL and MN and negative value at the lines LM and NK. Said curve has zero value not only at the lines K and M where the curve AA$^{12}$ has zero value but also has zero value at the intermediate points L and N. By reason of zero value at said lines, the vibrations represented by the curve D do not affect the signals $e^2$ and $e^3$. It will be understood that the relationship of the curve D to the curve AA$^{12}$ as shown in Fig. 14 is merely exemplary and subject to variation.

*Means for indicating lift differences—Fig. 22*

As fully explained in connection with Fig. 19, the voltage signals $e^2$ and $e^3$ are respectively dependent upon the particular rotors that are unbalanced and as to each rotor the polarity of the average signal is dependent upon direction of the lift difference and upon the lagging or leading of the slave blade and resultantly upon unbalance. In order that either signal may be utilized, it is necessary to eliminate the cyclic two-per-revolution variations therein as shown in Fig. 20. Before such variations can be eliminated, the signal must be converted to direct current. Referring first to the signal $e^2$ for the right rotor 12, the conversion to direct current is effected by means of a suitable rectifier 178 preferably located on the fuselage as indicated in Fig. 1. The rectifier 178 is preferably a synchronous chopper as shown in Fig. 22. A filter network 180 is associated with the rectifier, this network serving for the elimination of the cyclic component of the voltage.

Referring more particularly to Fig. 22, the rectifier or chopper comprises a single pole double throw switch having a permanently magnetized movable contact 182 connected with the conductor 168 and operable by a solenoid 184. The magnetized contact 182 is engageable with stationary contacts 186, 188 connected respectively with conductors 190, 192. The solenoid 184 is connected by conductors 146$^a$ and 147$^a$ with the conductors 146 and 147 and is therefore excited by the same current that excites the synchro coil 145. At a given instant the polarity of 146$^a$ is positive with respect to 147$^a$ and it may be assumed that the polarity of the solenoid is such that the magnetized contact 182 is attracted to engage the stationary contact 188. Then the polarity of 147 is positive with respect to 146 and the polarity of the solenoid is reversed and the magnetized contact 182 is repelled to engage the stationary contact 186. The reversals of polarity occur with the frequency of the current supplied to the solenoid 184 and the movable contact 182 therefore moves from one to the other of said contacts 186 and 188 in accordance with said frequency. The result is that direct current rather than alternating current is supplied to the conductors 190, 192.

The conductor 166 and said conductors 190, 192 are connected with conductors 194, 196 by means of the said filter network 180 comprising resistors and condensers $R^1$, $C^1$, $R^2$, $C^2$. The filter network eliminates the cyclic two-per-revolution component of the voltage $e^2$ and delivers a steady current signal $e^4$ to the conductors 194 and 196, said signal having a polarity dependent upon the direction of the lift difference which results in the lagging or leading of the slave blade 20 and which therefore results in the unbalance of the rotor 12. For simplicity of explanation it is assumed that the voltage $e^4$ is positive when the slave blade has a greater lift and therefore lags and that the voltage $e^4$ is negative when the slave blade has a lesser lift and therefore leads.

The rectifier 178 and the filter network 180 also serve to eliminate the cyclic variations that occur in the circuit for a balanced rotor as shown in Fig. 21, or the cyclic variations that occur when the helicopter is tilted but with no rotor unbalance.

The current $e^4$ resulting as above described is applied to a null-center indicating device 198 having a solenoid 200. Said device has a member 202 which is movable by the core of the solenoid 200 between two positions 202$^a$ and 202$^b$ according to the polarity of the signal $e^4$ and these may be upper and lower positions. When the signal $e^4$ is zero, the member 202 is in a central position.

The described electrical connections and devices are duplicated for the signal $e^3$ for the left rotor 14. The duplicate parts include a rectifier 204 similar to the rectifier 178, a filter network 206 similar to the network 180, a steady current signal $e^5$ resulting. The current $e^5$ actuates an indicating device 208 similar to the indicating device 198, said device 208 having an indicating member 210 similar to the member 202 and movable to the positions $210^a$ and $210^b$. Repetition of the description is unnecessary.

The blade adjusting mechanism shown schematically in Fig. 8 may be assumed to be for the right rotor 12 and this mechanism is duplicated for the left rotor 14. The duplicated mechanism includes a handle 212 which is similar to the handle 128 and which serves to operate the corresponding step switch 124 for correcting unbalance in said left rotor 14.

The indicating members 202 and 210 for the two rotors are within the range of observation of the pilot at said pilot position 31 and if either of said members is in a position other than its central position the pilot is warned that there is unbalance in the lift of the blades of the corresponding rotor. The position of the member 202 or 210 indicates the direction of the unbalance, and the upper position may indicate too large a lift for the corresponding slave blade and the lower position may indicate too small a lift for the corresponding slave blade. Then the pilot, knowing which rotor is unbalanced and what direction of correction is required, effects such correction by means of the handle 128 or the handle 212 and the corresponding step switch 124. The correction is continued until the member 202 or 210 moves to its central position, thus indicating that uniformity of lift has been attained. The indicator members 188 are preferably respectively adjacent the handles 128 and 212 as shown in Fig. 22, and said indicator members and handles are in any event all readily available to the pilot in his normal pilot position at 31.

*Automatic means for correcting lift differences—Fig. 23*

In order that the pilot may be relieved of the burden of manually correcting unbalance, it may be preferred to substitute null-center relays 214 and 216 for the null-center indicator devices 198 and 208. These relays and related parts are shown in Fig. 23.

The relay 214 and the parts connected therewith will first be described. Said relay 214 has a movable contact 218 operable by the relay solenoid 220, which is connected in the same manner as the solenoid 200 of the device 198. This movable contact may be regarded as also constituting an indicating device. The relay 214 has stationary contacts 222, 224. Said movable contact 218 is connected with a conductor 226 extending from a suitable current source of direct current. When the signal $e^4$ is zero, the contact 218 is in its intermediate position as shown. Positive voltage at $e^4$ moves the contact 218 into engagement with one of the contacts 222, 224 and this may be the upper contact 222. Negative voltage at $e^4$ moves the contact 218 into engagement with the other contact 224.

The contacts 222, 224 are connected by conductors 228, 230 with a reversible direct current servomotor 232 which is operated in one direction or the other according to the polarity of the voltage in the null-center relay 214, the polarity of said voltage being dependent on the lagging or leading of the slave blade 20 of the rotor 12 as previously explained. By means of speed reducing gearing in a box 234, the motor 232 is connected to the shaft 130 for operating the step switch 124. The step switch is operated in one direction or the other to operate the blade lift adjusting mechanism until the null-center relay 214 moves to central position, this taking place when the required blade adjustment has been completed.

The relay 216 and the parts connected therewith are duplicates of the relay 214 and its connected parts and the description need not be repeated. The said parts include a reversible motor 236 similar to the motor 232 and similarly connected with the shaft 130 of the adjusting mechanism for the right rotor 14.

*Helicopter with three-bladed rotors*

For a helicopter with three-bladed rotors, the second synchro 142 having two secondary coils with an angular spacing of 90° would be replaced by a similar synchro having three secondary coils with an angular spacing of 120°. The indicating and adjusting circuits and mechanisms as shown in Figs. 22 and 23 would be duplicated for each rotor.

*Helicopter with only one rotor*

The invention has been shown and described as embodied in a helicopter having two rotors. However, the invention is not so limited and it is applicable to a helicopter having only one rotor.

The diagram of electrical connections in Fig. 22 is readily modified to be applicable to a single rotor helicopter. Assuming that the single rotor is a two-bladed rotor such as 12, it is only necessary to modify the parts and connections as shown in Fig. 22 by omitting or not using the coil 164 of the second synchro 142 and by omitting or not using the conductor 170 and the parts connected therewith such as the rectifier 204, the filter network 206 and the indicating device 208.

With only one rotor, the first synchro 140 acts as previously described, but the vibrations are simplified and in the charts in Figs. 12 and 13 said vibrations are represented respectively only by said curves $AA^{12}$ and $AB^{12}$. The coils 160 and 162 of the second synchro 142 act as previously described, but said synchros induce maximum voltages only at the positions L and N, Figs. 15 and 17. Positive or negative signals $e^2$ are induced as shown in the upper portion of Fig. 20 but there are no signals $e^3$.

For a single three-bladed rotor, the synchro 142 would be replaced by a synchro having three equally spaced coils as previously described, and the indicating and adjusting circuits and mechanisms as shown in the upper portions of Figs. 22 and 23 would be duplicated.

The invention claimed is:

1. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade and said fuselage being subject to vibration in synchronism with rotor rotation as the result of rotor unbalance due to a difference between the lift of said slave blade and that of said master blade, the combination with said rotor of a device on said fuselage automatically responsive to any vibration thereof resulting from said difference in blade lift, an electrical device located on the fuselage and mechanically connected for movement in timed relation with the rotation of said rotor which device is electrically connected with and electrically controlled by said vibration responsive device, and means controlled by said movable electrical device and serving to indicate any existing difference in blade lift and also serving to indicate the direction of such difference so that said difference may be corrected by lift adjustment of said slave blade in the proper direction.

2. A helicopter as set forth in claim 1, wherein said movable electrical device is rotary and is connected to make one revolution for each revolution of the rotor.

3. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade and said fuselage being subject to vibration in synchronism with rotor rotation as the result of rotor unbalance due to a difference between the lift of said slave blade and that of said master blade, the combination with said rotor of a device on said fuselage automatically responsive to any vibration thereof resulting from said difference in blade lift, an electrical device located on the fuselage and mechanically connected for movement in timed relation with the rotation of said rotor which device is electrically connected with and electrically controlled by said vibration responsive device, means controlled by said movable electrical device and serving to indicate any existing difference in blade lift and also serving to indicate the direction of such difference so that said difference may be corrected by lift adjustment of said slave blade in the proper direction, a mechanism carried by said rotor and connected with the slave blade thereof for adjusting the lift of said slave blade, and control means carried by the fuselage independently of said rotor and operatively connected with said adjusting mechanism on the rotor for effecting and controlling the operation of said adjusting mechanism during rotation of said rotor to effect lift adjustment of said slave blade in the direction and to the extent indicated by said indicating means.

4. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade and said fuselage being subject to vibration in synchronism with rotor rotation as the result of rotor unbalance due to a difference between the lift of said slave blade and that of said master blade, the combination with said rotor of a device on said fuselage automatically responsive to any vibration thereof resulting from said difference in blade lift, an electrical device located on the fuselage and mechanically connected for movement in timed relation with the rotation of said rotor which device is electrically connected with and electrically controlled by said vibration responsive device, means controlled by said movable electrical device and serving to indicate any existing difference in blade lift and also serving to indicate the direction of such difference so that said difference may be corrected by lift adjustment of said slave blade in the proper direction, a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said adjusting mechanism during rotation of said rotor, and mechanism enabling said indicating means to automatically cause the operation of said control means to effect lift adjustment of said slave blade in the direction and to the extent required for lift equalization.

5. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade and said fuselage being subject to vibration in synchronism with rotor rotation as the result of rotor unbalance due to a difference between the lift of said slave blade and that of said master blade, the combination with said rotor of first and second synchros on said fuselage each comprising relatively movable primary and secondary units having coils, means for supplying alternating primary current to the primary coil of the first synchro, means for oscillating one unit of the first synchro in conformity with said vibration of said fuselage so as to induce an alternating current in the secondary coils of said first synchro the voltage of which secondary current varies cyclically between positive and negative in conformity with said fuselage vibration, electrical connections for transmitting the last said current from said secondary coils of the first synchro to the primary coil of the second synchro where it constitutes a second primary current, means for rotatively moving one unit of said second synchro in timed relation with rotor rotation so that said second primary current induces in the secondary coil of the second synchro a secondary alternating current that varies in accordance with fuselage vibration and therefore in accordance with rotor unbalance, and means electrically connected with the last said secondary coil and dependent upon the last said alternating current for indicating any difference in blade lift resulting in said rotor unbalance and for also indicating the direction of such difference so that said difference may be corrected by lift adjustment of said slave blade in the proper direction.

6. A helicopter as set forth in claim 5, wherein the means for rotating one unit of the second synchro is constructed and arranged to be so timed in relation to the means for oscillating one unit of the first synchro that the voltage induced in the secondary coil of the second synchro is either positive or negative in accordance with the direction in which the lift of the slave blade differs from that of the master blade, and wherein said electrically connected indicating means is constructed and arranged to indicate said positive or negative voltage and to therefore indicate the direction of said difference in the lift of said slave blade.

7. A helicopter as set forth in claim 5, wherein the means for rotating one unit of the second synchro is constructed and arranged to be so timed that during each rotor rotation the primary and secondary coils of said second synchro are in the position for generating maximum voltage in said secondary coil when the voltage of said cyclically varying current transmitted from said first synchro is at its maximum.

8. A helicopter as set forth in claim 7, wherein the means for rotatively moving the rotatively movable unit of the second synchro is constructed and arranged to rotate said unit at a speed which is the same as that of the rotor.

9. A helicopter as set forth in claim 7, wherein the average positive and negative values of the voltage of the last said alternating current respectively correspond to greater or lesser lifts of said slave blade, and wherein the means for indicating a lift difference and the direction thereof includes means for rectifying the said current to direct current, a filter network for eliminating the cyclic changes in said voltage with the result that said average positive or negative voltage remains, and an indicator for indicating the said positive or negative voltage and for thus indicating greater or lesser lift of said slave blade.

10. A helicopter as set forth in claim 9, including a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said adjusting mechanism during rotation of said rotor, and mechanism enabling said indicating means to automatically cause the operation of said control means to effect lift adjustment of said slave blade in the direction and to the extent required for lift equalization.

11. In a helicopter comprising a fuselage and two substantially vertical rotatable shafts connected therewith and power driven for rotation in unison and also comprising two rotors respectively connected with said shafts each including a hub and at least two similar blades connected with the hub at their inner ends, one of said blades of each rotor constituting a master blade and at least one other of said blades being a slave blade and being adapted for lift adjustment relatively to said master blade and said fuselage being subject to vibration in synchronism with the rotation of either or both rotors as the result of the unbalance of either or both of said rotors due to differences between the lifts of said slave blades and the lifts of the corresponding master blades, the combination with said rotors of a device on said fuselage automatically responsive to any vibration thereof resulting from either or both of said differences in blade lift, an electrical device located on the fuselage and mechanically connected for movement in timed relation with the rotation of said rotors which device is electrically connected with and electrically controlled by said vibration responsive device, and two means controlled by said movable electrical device and serving respectively to indicate any existing difference in blade lift in corresponding rotors and also serving respectively to indicate the direction of such difference in corresponding rotors so that each said difference may be corrected by lift adjustment of the corresponding slave blade in the proper direction.

12. In a helicopter comprising a fuselage and two substantially vertical rotatable shafts connected therewith and power driven for rotation in unison and also comprising two rotors respectively connected with said shafts each including a hub and at least two similar blades connected with the hub at their inner ends, one of said blades of each rotor constituting a master blade and at least one other of said blades being a slave blade and being adapted for lift adjustment relatively to said master blade and said fuselage being subject to vibration in synchronism with the rotation of either or both rotors as the result of the unbalance of either or both of said rotors due to differences between the lifts of said slave blades and the lifts of the corresponding master blades, the combination with said rotors of a device on said fuselage automatically responsive to any vibration thereof resulting from either or both of said differences in blade lift, an electrical device located on the fuselage and mechanically connected for movement in timed relation with the rotation of said rotors which device is electrically connected with and electrically controlled by said vibration responsive device, two means controlled by said movable electrical device and serving respectively to indicate any existing difference in blade lift in corresponding rotors and also serving respectively to indicate the direction of such difference in corresponding rotors so that each said difference may be corrected by lift adjustment of the corresponding slave blade in the proper direction, two mechanisms carried respectively by said rotors and connected respectively with the slave blades thereof for adjusting the lifts of said slave blades, and two control means carried by the fuselage independently of said rotors and operatively connected respectively with said adjusting mechanisms on said rotors for effecting and controlling the operation of said respective adjusting mechanisms during rotation of said rotors to effect adjustments of said slave blades in the directions and to the extents indicated respectively by said two indicating means.

13. In a helicopter comprising a fuselage and two substantially vertical rotatable shafts connected therewith and power driven for rotation in unison and also comprising two rotors respectively connected with said shafts each including a hub and at least two similar blades connected with the hub at their inner ends, one of said blades of each rotor constituting a master blade and at least one other of said blades being a slave blade and being adapted for lift adjustment relatively to said master blade and said fuselage being subject to vibration in synchronism with the rotation of either or both rotors as the result of the unbalance of either or both of said rotors due to differences between the lifts of said slave blades and the lifts of the corresponding master blades, the combination with said rotors of a device on said fuselage automatically responsive to any vibration thereof resulting from either or both of said differences in blade lift, an electrical device located on the fuselage and mechanically connected for movement in timed relation with the rotation of said rotors which device is electrically connected with and electrically controlled by said vibration responsive device, two means controlled by said movable electrical device and serving respectively to indicate any existing difference in blade lift in corresponding rotors and also serving respectively to indicate the direction of such difference in corresponding rotors so that each said difference may be corrected by lift adjustment of the corresponding slave blade in the proper direction, two mechanisms carried respectively by said rotors and connected respectively with the slave blades thereof for adjusting the lifts of said slave blades, two control means carried by the fuselage independently of said rotors and operatively connected respectively with said adjusting mechanisms on said rotors for effecting and controlling the operation of said respective adjusting mechanisms during ortation of said rotors to effect adjustments of said slave blades in the directions and to the extents indicated respectively by said two indicating means, and two mechanisms respectively enabling said two indicating means to automatically cause the operation of said two control means so as to respectively effect lift adjustments of said slave blades respectively in the directions and to the extents required for lift equalization.

14. In a helicopter comprising a fuselage and two substantially vertical rotatable shafts connected therewith and power driven for opposite rotation in unison and also comprising two rotors on said shafts each including a hub and a plurality of less than four equally spaced similar blades connected with the hub at their inner ends which rotors are so connected with said shafts that when any one blade of either rotor is in a transverse position two blades of the other rotor are equally spaced from said transverse blade, one of said blades of each rotor constituting a master blade and at least one other of said blades being a slave blade and being adapted for lift adjustment relatively to said master blade and said fuselage being subject to vibration in synchronism with the rotation of either or both rotors as the result of the unbalance of either or both rotors due to differences between the lifts of said slave blades and the lifts of the corresponding master blades, the combination with said rotors of first and second synchros on said fuselage each comprising two relatively movable primary and secondary units with the primary unit of each synchro having a single coil and with the secondary unit of the first synchro having two angularly spaced radial coils connected at their inner ends and with the secondary unit of the second synchro having a plurality of radial coils corresponding to the plurality of blades on each rotor which coils have an angular relationship that is the same as that of two adjacent rotor blades, means for supplying alternating primary current to the primary coil of the first synchro, means for oscillating one unit of the first synchro in conformity with said vibration of said fuselage so as to induce an alternating secondary current in the secondary coils of said first synchro which secondary current has a voltage varying cyclically between positive and negative in conformity with said fuselage vibration and has or may have two components conforming respectively to the vibration components resulting from the unbalance of the two rotors, electrical connections for transmitting the last said current from said secondary coils of the first synchro to the primary coil of the second synchro where it constitutes a second primary current, means for rotatively moving one unit of said second synchro in timed relation with rotor rotation so that said second primary current induces in said plurality of secondary coils of the second synchro a plurality of secondary alternating currents that vary respectively in accordance with the corresponding components of the second primary current, and a plurality of means electrically connected respectively with said secondary coils of the second synchro and dependent respectively upon the last said alternating currents each of which last said means is adapted for indicating any difference in the blade lift of a slave blade from that of the corresponding master blade and for also indicating the direction of such difference so that said difference may be corrected by lift adjustment of said slave blade in the proper direction.

15. In a helicopter comprising a fuselage and two substantially vertical rotatable shafts connected therewith and power driven for opposite rotation in unison and also comprising two rotors on said shafts each including a hub and two oppositely disposed similar blades connected with the hub at their inner ends which rotors are so connected with said shafts that the blades of either rotor are transverse when those of the other rotor are longitudinal, one of said blades of each rotor constituting a master blade and the other of said blades being a slave blade and being adapted for lift adjustment relatively to said master blade and said fuselage being subject to vibration in synchronism with the rotation of either or both rotors as the result of the unbalance of either or both rotors due to differences between the lifts of said slave blades and the lifts of the corresponding master blades, the combination with said rotors of first and second synchros on said fuselage each comprising relatively movable primary and secondary units with the primary unit of each synchro having a single coil and with the secondary unit of the first synchro having two angularly spaced radial coils connected at their inner ends and with the secondary unit of the second synchro having two radial coils at an angular spacing of 90°, means for supplying alternating primary current to the primary coil of the first synchro, means for oscillating one unit of the first synchro in conformity with said vibration of said fuselage so as to induce an alternating secondary current in the secondary coils of said first synchro which secondary current has a voltage varying cyclically between positive and negative in conformity with said fuselage vibration and has or may have two components conforming respectively to the vibration components resulting from the unbalance of the two rotors, electrical connections for transmitting the last said current from said secondary coils of the first synchro to the primary coil of the secondary synchro where it constitutes a second primary current, means for rotatively moving one unit of said second synchro in timed relation with rotor rotation so that said second primary current induces in the two secondary coils of the second synchro two alternating currents that vary respectively in accordance with the corresponding components of the second primary current, and two means electrically connected respectively with said secondary coils of the second synchro and dependent respectively upon the last said alternating currents each of which last said means is adapted for indicating any difference in the blade lift of a corresponding slave blade from that of the corresponding master blade and for also indicating the direction of such difference so that said difference may be corrected by lift adjustment of said slave blade in the proper direction.

References Cited in the file of this patent

UNITED STATES PATENTS

| | | |
|---|---|---|
| 2,408,489 | Stalker | Oct. 1, 1946 |
| 2,620,888 | Avery | Dec. 9, 1952 |